United States Patent [19]

Brackett

[11] Patent Number: 4,685,346

[45] Date of Patent: Aug. 11, 1987

[54] POWER TRANSMISSION SYSTEM

[75] Inventor: George E. Brackett, Cape Elizabeth, Me.

[73] Assignee: Maxaxam Corporation, Oradell, N.J.

[21] Appl. No.: 588,969

[22] Filed: Mar. 13, 1984

[51] Int. Cl.$^4$ .......................... F16H 1/16; F16H 55/10
[52] U.S. Cl. ...................................... 74/427; 74/440; 74/465
[58] Field of Search ................. 74/465, 464, 458, 425, 74/440, 424.7, 424.5, 89.14, 444, 427

[56] References Cited

U.S. PATENT DOCUMENTS

| | | | |
|---|---|---|---|
| Re. 26,979 | 11/1970 | Petroff | 74/817 |
| Re. 27,994 | 4/1974 | Reeve | 74/393 |
| Re. 30,049 | 7/1979 | Schutz | 74/425 |
| 431,067 | 7/1890 | Lieb | 74/459 |
| 626,515 | 6/1899 | Whitney | 74/464 |
| 715,973 | 12/1902 | Butler | 74/424.7 |
| 747,463 | 12/1903 | Moore | 74/424.7 |
| 767,533 | 8/1904 | Moakler | 74/464 |
| 781,600 | 1/1905 | Hamachek | 74/426 |
| 815,979 | 3/1906 | Richards | 74/458 |
| 908,049 | 12/1908 | Teal | 74/464 |
| 921,593 | 5/1909 | Collier | 74/458 |
| 1,060,933 | 5/1913 | Myers | 74/424.7 |
| 1,145,826 | 7/1915 | Auble | 74/464 |
| 1,262,932 | 4/1918 | Egg | 74/464 |
| 1,273,533 | 7/1918 | Phahler | 74/464 |
| 1,317,232 | 9/1919 | Spillman | 74/440 |
| 1,349,719 | 8/1920 | Gardiner | 74/464 |
| 1,519,895 | 12/1924 | Andrews | 74/425 |
| 1,558,222 | 10/1925 | Beetow | 74/440 |
| 1,580,055 | 4/1926 | Lax | 74/464 |
| 1,603,557 | 10/1926 | Schleier | 74/464 |
| 1,608,050 | 11/1926 | Bailey | 74/440 |
| 1,725,034 | 8/1929 | Wennerstrom | 74/427 |
| 1,982,768 | 12/1934 | Stevenson | 74/458 |
| 2,206,831 | 7/1940 | Berthelsen | 74/440 |
| 2,310,232 | 2/1943 | Hale | 74/440 |
| 2,714,315 | 8/1955 | Reader et al. | 74/465 |
| 2,975,652 | 8/1961 | Bishop | 74/458 |
| 3,266,334 | 8/1966 | Zak | 74/458 |
| 3,383,939 | 5/1968 | Folkerts | 74/497 |
| 3,597,990 | 5/1970 | McCartin | 74/464 |
| 3,648,535 | 8/1972 | Maroth | 74/459 |
| 3,720,115 | 3/1973 | Vertin | 74/424.6 |
| 3,766,788 | 10/1973 | Metz | 74/424.8 R |
| 3,820,413 | 6/1974 | Brackett | 74/465 |
| 3,851,539 | 12/1974 | Durand | 74/425 |
| 4,008,625 | 2/1977 | Malhotra | 74/465 |
| 4,047,449 | 9/1977 | Popov | 74/458 |
| 4,217,793 | 8/1980 | Abe | 74/425 |

FOREIGN PATENT DOCUMENTS

| | | |
|---|---|---|
| 237252 | 7/1925 | United Kingdom . |
| 1538612 | 3/1976 | United Kingdom . |
| 2115902 | 9/1983 | United Kingdom . |
| 0670758 | 6/1979 | U.S.S.R. .............................. 74/427 |

OTHER PUBLICATIONS

"Worm Drive's Roller Wheel Boosts Speed, Efficiency" *Design News* Jan. 10, 1983, p. 88–89.
Squirm Drive Brochure—Anti-Friction Rolling Motion Between the Worm Screw and Worm Wheel.

Primary Examiner—Leslie Braun
Assistant Examiner—David Novais
Attorney, Agent, or Firm—Lerner, David, Littenberg, Krumholz & Mentlik

[57] ABSTRACT

A worm drive system includes a worm wheel having two sets of angularly arranged rollers. Each set of rollers mates with a separate screw thread on a worm screw associated with the worm wheel. The worm drive system may also include a second worm screw having two separate screw threads, each one mating with a corresponding set of rollers on the worm wheel. The worm drive system may be used as a speed increaser and/or a speed decreaser by suitably selecting the ratio between the worm wheel and the worm screws. The worm screws rotate in the same angular direction if the screw threads on one worm screw have the same hand, which is different from the hand of the screw threads on the other worm screw. The worm drive system also has a load-sharing capability and an anti-backlash capability.

20 Claims, 12 Drawing Figures

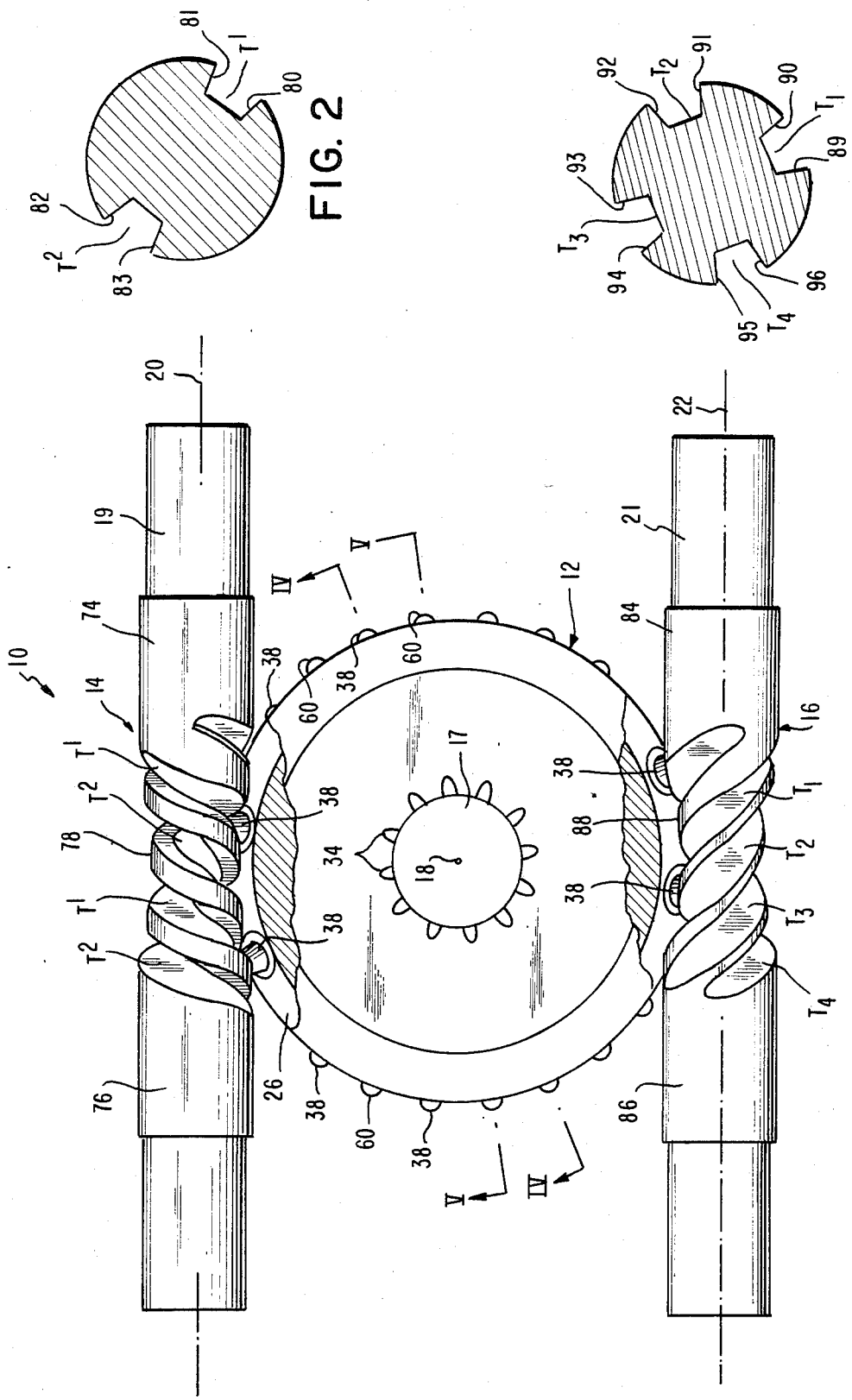

POWER TRANSMISSION SYSTEM

FIELD OF THE INVENTION

The present invention relates to a power transmission system, and, more particularly, to such a system of the worm drive type which employs an enveloping-type worm screw and a roller worm wheel.

BACKGROUND OF THE INVENTION

Conventional worm gear sets employ a worm screw and a fixed tooth gear wheel. Although such worm gear sets are successful drive mechanisms at low speeds, their efficiency is limited due to the rubbing or sliding contact between the fixed teeth of the gear wheel and the screw thread of the worm screw.

By substituting rollers for the fixed teeth of the gear wheel of the conventional worm gear sets, the friction between the gear wheel (which because of such substitution would now be more appropriately referred to as a roller worm wheel) and the worm screw can be reduced, thereby improving the efficiency of the resulting worm drive system. Worm drive systems employing a worm screw and a roller worm wheel have been proposed in the past. Such systems can be divided into the following three categories.

The first category is characterized by roller worm wheels which employ radially arranged rollers (i.e., the axis of rotation of each roller lies in a plane which is normal to the axis of rotation of the worm wheel). The drive systems diagnosed in U.S. Pat. Nos. 626,515; 715,973; 747,463; 767,588 and 3,597,990 are exemplary of this first category. These worm drive systems have limited power transmitting capability and limited load carrying capacity because the radially arranged rollers make it difficult to employ the type of bearings (i.e., needle bearings) required to transmit high power and carry large loads. Because the rollers would have to extend into the worm wheel in order to be used in combination with needle bearings, the number of rollers which could be employed without causing interference between their associated bearings would be limited, thereby limiting power transmitting capability and load carrying capacity even if such bearings were used.

The second category is characterized by roller worm wheels which employ a set of radially arranged rollers and two or more sets of angularly arranged rollers (i.e., the axis of rotation of each roller forms an inclined angle relative to a plane which is normal to the axis of rotation of the worm wheel). The worm drive systems disclosed in U.S. Pat. No. 908,049; 1,060,933 and 3,820,413 exemplify this category. Due to their utilization of radially arranged rollers, these drive systems suffer from the same power transmitting and load carrying limitations as the first category discussed above. They also, however, suffer from a further limitation in that their worm wheels can only be used in combination with two worm screws of the same hand which, therefore, would rotate in opposite angular directions. Thus, the worm drive systems of the second category would have no utility in applications requiring two worm screws which rotate in the same angular direction.

The third category is characterized by a worm wheel which employs angularly arranged rollers only and a worm screw having a single double-cut screw thread. More particularly, the worm wheel is provided with two sets of rollers, the rollers of one set having full tips and the rollers of the other set having stepped tips. The worm screw is provided with a single screw thread having a first helical path generated to accept the rollers with the full tips and a second helical path generated to accept the rollers with the stepped tips. Because all of the rollers are only rolling in half threads, the power transmitting capacity and the load carrying capability of such a worm drive system is limited. Further, the worm drive system will only run in one direction to full capacity because when the direction of rotation of the worm screw is reversed the rollers with the stepped tips will be out of engagement with a thread surface and the rollers with full tips will engage a half thread surface only.

SUMMARY OF THE INVENTION

The problems and disadvantages of the prior art devices described above are overcome in accordance with the present invention by providing a worm drive system which includes a worm wheel mounted for rotation about an axis or rotation. The worm wheel has two sets of angularly arranged rollers without any additional rollers being interposed therebetween. A first worm screw has a first screw thread which matingly engages one set of rollers of the worm wheel and a second screw thread which matingly engages the other set of rollers of the worm wheel. The first and second screw threads of the first worm screw are completely separate and distinct from each other. The worm wheel and the first worm screw have a predetermined ratio between them.

In one embodiment, the worm drive system further includes a second worm screw having a first screw thread which matingly engages the first set of rollers of the worm wheel and a second screw thread which matingly engages the second set of rollers of the worm wheel. The first and second screw threads of the second worm screw are completely separately and distinct from each other. By designing the second worm screw such that it and the worm wheel have a predetermined ratio between them which is different from the predetermined ratio between the worm wheel and the first worm screw, the worm drive system may be used as a speed increaser and/or a speed decreaser.

Another embodiment of the present invention involves designing the first and second screw threads of the first worm screw such that they have the same hand, while designing the first and second screw threads of the second worm screw such that they have a hand opposite from that of the first and second screw threads of the first worm screw. Such a design permits the first and second worm screws to rotate in the same angular direction when they are driven by the worm wheel.

In yet another embodiment of the present invention, the rollers of the first and second sets of rollers are received in the worm wheel such that the rollers are movable between a fully extended position and a retracted position. Each of the rollers is urged into its fully extended position by exerting a force on it equal to a predetermined percentage of the overall load on the worm wheel. When a roller is subjected to a load which exceeds its predetermined percentage of the overall load, the roller will automatically move from its fully extended position to its retracted position, to prevent the roller from carrying more than its predetermined percentage of the overall load.

A further embodiment of the present invention involves dividing the worm wheel into a first segment, which is fixedly attached to a shaft, and a second segment, which is rotatable about the shaft. The first segment carries the first set of rollers, while the second segment carries the second set of rollers. The first segment is urged in one angular direction with respect to the shaft, while the second segment is simultaneously urged in an opposite angular direction with respect to the shaft, whereby the rollers of the first set of rollers are constantly urged toward a trailing thread surface on their corresponding screw thread or threads and the rollers of the second set of rollers are constantly urged towards a leading surface on their associated screw thread or threads.

BRIEF DESCRIPTION OF THE DRAWINGS

For a more complete understanding of the present invention, reference is made to the following detailed description of various exemplary embodiments considered in conjunction with the accompanying drawings, in which:

FIG. 1 is a side view of a worm drive system constructed in accordance with the present invention, a portion of the worm drive system being broken away to facilitate consideration and discussion;

FIG. 2 is a diagrammatic illustration of a cross section of a worm screw employed by the worm drive system shown in FIG. 1;

FIG. 3 is a diagrammatic illustration of a cross section of another worm screw employed by the worm drive system shown in FIG. 1;

DESCRIPTION OF THE EXEMPLARY EMBODIMENTS

Figure 5:
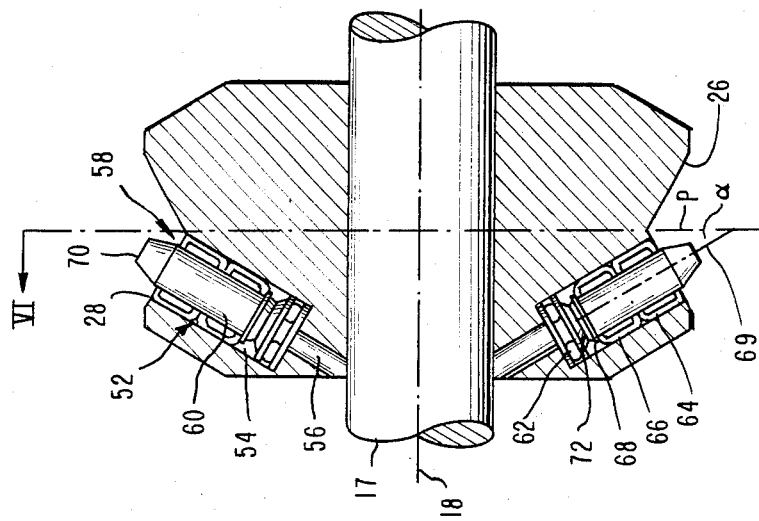
FIG. 5 is a cross-sectional view, taken along line V—V in FIG. 1 and looking in the direction of the arrows, of the worm wheel employed by the worm drive system illustrated in FIG. 1.
Figure 4:
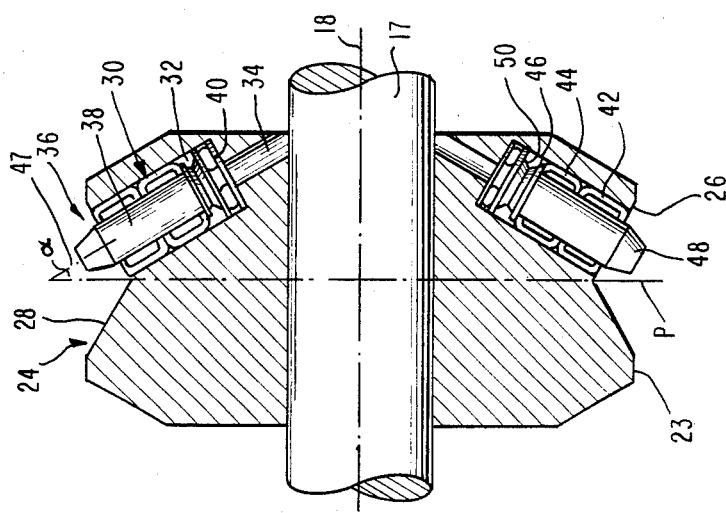
FIG. 4 is a cross-sectional view, taken along line IV—IV in FIG. 1 and looking in the direction of the arrows, of a worm wheel employed by the worm drive system illustrated in FIG. 1.
Figure 6:
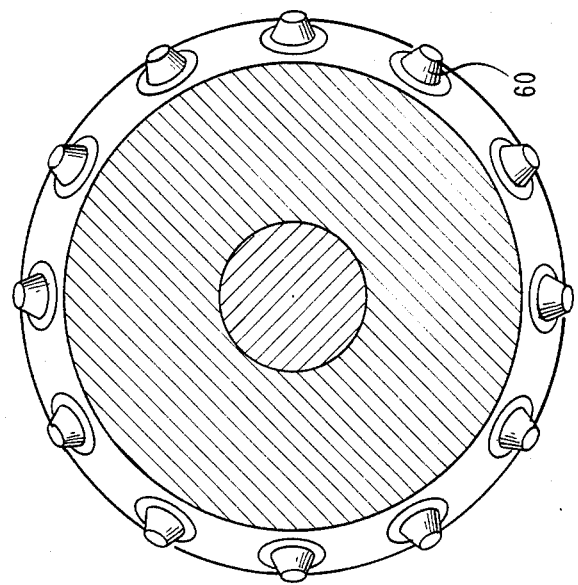
FIG. 6 is a cross-sectional view, taken along line VI—VI in FIG. 5 and looking in the direction of the arrows, of the worm wheel shown in FIG. 5.
Figure 7:
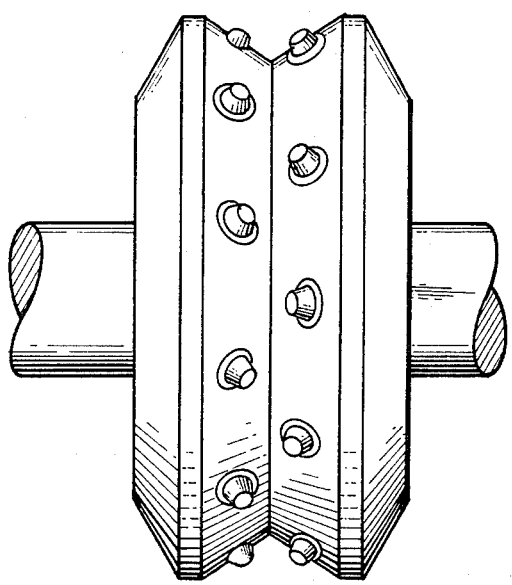
FIG. 7 is an edge view of the worm wheel illustrated in FIGS. 1 and 4-6.

Referring to FIG. 1-7, there is shown a worm drive system 10 which includes a worm wheel 12 and two enveloping-type worm screws 14, 16. The worm wheel 12 is attached to a rotatable shaft 17 such that the worm wheel 12 rotates conjointly with the shaft 17 about a central longitudinal axis 18 of the shaft 17. The worm screw 14 is attached to a rotatable shaft 19 such that the worm screw 14 rotates conjointly with the shaft 19 about a central longitudinal axis 20 of the shaft 19. The worm screw 16 is attached to a rotatable shaft 21 such that the worm screw 16 rotates conjointly with the shaft 21 about a central longitudinal axis 22 of the shaft 21. The worm wheel shaft 17 and the worm screw shafts 19, 21 are arranged such that the power transfer from the worm wheel shaft 17 to the worm screw shafts 19, 21 is at a ninety degree turn.

The worm wheel 12 has an outer circumferential surface 23, which is provided with an annular notch 24 sized and shaped so as to provide clearance for the worm screws 14, 16. The notch 24 forms two flat angularly opposed surfaces 26, 28.

The surface 26 includes a number of bores 30, each of which is perpendicular to the surface 26 and incudes a large diameter section 32 and a small diameter section 34. The large diameter section 32 receives a roller pin assembly 36, including a roller pin 38, a thrust bearing 40, a pair of radial needle bearings 42, 44 and a retaining ring 46. The radial needle bearings 42, 44 are press fitted or otherwise inserted into the large diameter section 32 of the bore 30 in rolling engagement with the roller pin 38. The radial needle bearings 42, 44 cooperate with the thrust bearing 40 to permit the roller pin 38 to be freely rotatable in the large diameter section 32 of the bore 30 about an axis of rotation 47. The retaining ring 46, which is received in an annular groove (not shown) in the roller pin 38, engages the radial needle bearing 44 to maintain the roller pin 38 in the large diameter section 32 of the bore 30. Of course, other techniques may be employed to maintain the roller pin 38 in the large diameter section 32 of the bore 30. The roller pin 38 has a head 48 having an involute tooth shape. A disk spring 50 of a predetermined pressure is positioned between the thrust bearing 40 and the roller pin 38. The small diameter section 34 of the bore 30 is provided so that the roller pin assembly 36 can be pushed out of the large diameter section 32 of the bore 30 by inserting a suitable tool through the small diameter section 34.

The surface 28 includes a number of bores 52, each of which is perpendicular to the surface 28 and includes a large diameter section 54 and a small diameter section 56. The large diameter section 54 receives a roller pin assembly 58, including a roller pin 60, a thrust bearing 62, a pair of radial needle bearings 64, 66 and a retaining ring 68. The radial needle bearings 64 66 are press fitted or otherwise inserted into the large diameter section 54 of the bore 52 in rolling engagement with the roller pin 60. The radial needle bearings 64, 66 cooperate with the thrust bearing 62 to permit the roller pin 60 to be freely rotatable in the large diameter section 54 of the bore 52 about an axis of rotation 69. The retaining ring 68, which is received in an annular groove (not shown) in the roller pin 60, engages the radial needle bearing 66 to maintain the roller pin 60 in the large diameter section 54 of the bore 52. Of course, other techniques may be employed to maintain the roller pin 60 in the bore 52. The roller pin 60 has a head 70 having an involute tooth shape. a disk spring 72 of a predetermined pressure is positioned between the thrust bearing 62 and the roller pin 60. The small diameter section 56 of the bore 52 is provided so that the roller pin assembly 58 can be pushed out of the large diameter section 54 of the bore 52 by inserting a suitable tool through the small diameter section 56.

The roller pins 38, 60 are arranged at an angle ($\alpha$) of thirty degrees relative to a plane (P) which is normal to the axis 18 of the shaft 17. The angle (α) is selected so as to provide ample space for mounting the roller pin assemblies 36, 58, while permitting proper engagement of the roller pins 38, 60 with the worm screws 14, 16, respectively. It should be understood that the angle (α) may be varied depending upon the size and/or number of the roller pin assemblies 36, 58. The roller pin assemblies 36, 58 are further arranged such that the axes 47, 69 of the roller pins 38, 60, respectively, intersect the axes 20, 22 of the worm screws 14, 16 only at points intermediate the worm screws 14, 16. Thus, roller pins 38, 60 trace paths which are parabolic relative to the axes 20, 22 of the worm screws 14, 16. Moreover, the roller pins 38 are staggered in relationship to the roller pins 60. That is, each of the roller pins 38 is positioned between an adjacent pair of the roller pins 60 (see FIGS. 1 and 7). The location of the roller pins 38 relative to the roller pins 60 is determined by the pitch angle of the worm screws 14, 16.

The worm screw 14 has an hourglass shape. More particularly, the worm screw 14 includes two cylindrical opposed ends 74, 76 and a parabolic midsection 78. Further, the worm screw 14 includes two hourglass screw threads $T^1$, $T^2$ having the same hand. The screw thread $T^1$ has a pair of screw thread surfaces 80, 81 extending around the worm screw 14 along a helical path which matches the path generated by each of the roller pins 38 as the worm wheel 12 and the worm screw 14 are simultaneously rotated. The screw thread $T^2$ has a pair of screw thread surfaces 82, 83 extending around the worm screw 14 along a helical path which matches the path generated by each of the roller pins 60 as the worm wheel 12 and the worm screw 14 are simultaneously rotated. Because of the hourglass shape of the worm screw 14, at least two of the roller pins 38 are always engaged in the screw thread $T^1$, while at least two of the roller pins 60 are always engaged in the screw thread $T^2$. Both of the screw threads $T^1$, $T^2$ have a pitch of twelve to one, whereby the worm wheel 12 rotates once for every twelve revolutions of the worm screw 14. The worm screw 14 can be manufactured in accordance with a unique method and apparatus described and illustrated in copending U.S. patent application Ser. No. 588,967 filed concurrently herewith, now U.S. Pat. No. 4,588,337 which copending application is owned by the assignee of the present application and is entitled "APPARATUS AND METHOD FOR MACHINING AN ENVELOPING-TYPE WORM SCREW", the specification of such copending application being incorporated herein by reference.

The worm screw 16 has an hourglass shape. More particularly, the worm screw 16 includes two cylindrical opposed ends 84, 86 and a parabolic midsection 88. Further, the worm screw 16 includes four hourglass screw threads $T_1$, $T_2$, $T_3$, $T_4$ having the same hand which is, however, opposite to that of the screw threads $T^1$, $T^2$ of the worm screw 14. The screw thread $T_1$ has a pair of screw thread surfaces 89, 90 extending around the worm screw 16 along a helical path which matches the path generated by each of the roller pins 38 as the worm wheel 12 and the worm screw 16 are simultaneously rotated. The screw thread $T_2$ has a pair of screw thread surfaces 91, 92 extending around the worm screw 16 along a helical path which matches the path generated by each of the roller pins 60 as the worm wheel 12 and the worm screw 16 are simultaneously rotated. The screw thread $T_3$ has a pair of screw thread surfaces 93, 94 extending around the worm screw 16 along a helical path which matches the path generated by each of the roller pins 38 as the worm wheel 12 and the worm screw 16 are simultaneously rotated. The screw thread $T_4$ has a pair of screw thread surfaces 95, 96 extending around the worm screw 16 along a helical path which matches the path generated by each of the roller pins 60 as the worm wheel 12 and the worm screw 16 are simultaneously rotated. Because of the hourglass shape of the worm screw 16, at least one of the roller pins 38 is engaged in the screw thread $T_1$, while another one of the roller pins 38 is simultaneously engaged in the screw thread $T_3$. Similarly, at least one of the roller pins 60 is engaged in the screw thread $T_2$, while at least another one of the roller pins 60 is simultaneously engaged in the screw thread $T_4$. Thus, at least four of the roller pins 38, 60 are in simultaneous engagement with the worm screw 16 at any point in time. The screw threads $T_1$, $T_2$, $T_3$, $T_4$ have a pitch of six to one, whereby the worm wheel 12 rotates once for every six revolutions of the worm screw 16. Because the screw threads $T_1$, $T_2$, $T_3$, $T_4$ of the worm screw 16 have a different hand from the screw threads $T^1$, $T^2$ of the worm screw 14, the worm screw shafts 19, 21 rotate in the same angular direction. By making the hand of the screw threads $T_1$, $T_2$, $T_3$, $T_4$ the same as the hand of the screw threads $T^1$, $T^2$, the worm screw shafts 19, 21 could be made to rotate in an opposite direction. Like the worm screw 14, the worm screw 16 can be manufactured in accordance with the unique method and apparatus described and illustrated in the copending patent application identified above.

The worm drive system 10 lends itself to many unique applications. For instance, it can be utilized as a speed increaser and/or decreaser.

As a speed increaser, the worm wheel shaft 17 would be employed as an input shaft and the worm screw shafts 19, 21 would be employed as output shafts. With the worm screws having the ratios specified above, the rotational speed of the worm screw shaft 19 would be twelve times the rotational speed of the worm wheel shaft 17, while the rotational speed of the worm screw shaft 21 would be six times the rotational speed of the worm wheel shaft 17.

As a speed decreaser, the worm screw shaft 19 would be employed as an input shaft, while the worm wheel shaft 17 and the worm screw shaft 21 would be employed as output shafts. With the worm screws 14, 16 having the ratios specified above, the rotational speed of the worm wheel shaft 17 would be twelve times less than the rotational speed of the worm screw shaft 19, while the rotational speed of the worm screw shaft 21 would be two times less than the rotational speed of the worm screw shaft 19.

As a speed increaser and decreaser, the worm screw shaft 21 would be employed as an input shaft, while the worm wheel shaft 17 and the worm screw shaft 19 would be employed as output shafts. With the worm screws 14, 16 having the ratios specified above, the rotational speed of the worm wheel shaft 17 would be six times less than the rotational speed of the worm screw shaft 21, while the rotational speed of the worm screw shaft 19 would be two times greater than the rotational speed of the worm screw shaft 21.

In the preferred operation of the worm drive system 10, the total torque load is shared equally between all of the roller pins 38, 60 which are in engagement with the worm screws 14, 16. The resulting force applied to each such engaged roller pin has a radial component and an axial or thrust component. In order for the axial or thrust load to be shared equally by all of the engaged roller pins, the roller pins 38, 60 should, brom a theoretical standpoint, extend outwardly from the worm wheel 12 the same distance. It is, however, difficult to manufacture the worm drive system 10 such that all of the roller pins 38, 60 extend outwardly from the worm wheel 12 the same distance. The disk springs 50, 72 employed by the roller pin assemblies 36, 58, respectively, are designed to ensure that the axial or thrust load is shared equally between all of the engaged roller pins even if one or more of the roller pins 38, 60 extends outwardly from the worm wheel 12 more than the other roller pins.

By way of example, it is assumed that the total torque load on the worm drive system 10 is nine hundred and twenty four inch pounds and that there are a total of six engaged roller pins, resulting in a radial load on each engaged roller pin of one hundred and fifty four inch pounds and an axial or thrust load of nine inch pounds on each engaged roller pin. By designing the disk springs 50, 72 such that each one has a pressure of nine inch pounds, if, for whatever reason, the axial or thrust load on any of the engaged roller pins exceeds nine inch pounds, the disk spring associated with any such roller pin will be automatically depressed until the axial or thrust load is shared equally by all of the engaged roller pins. In addition to performing such a load-sharing function, the disk springs 50, 72 provide a practical manufacturing tolerance as well as a shock-absorbing feature.

Figure 10:
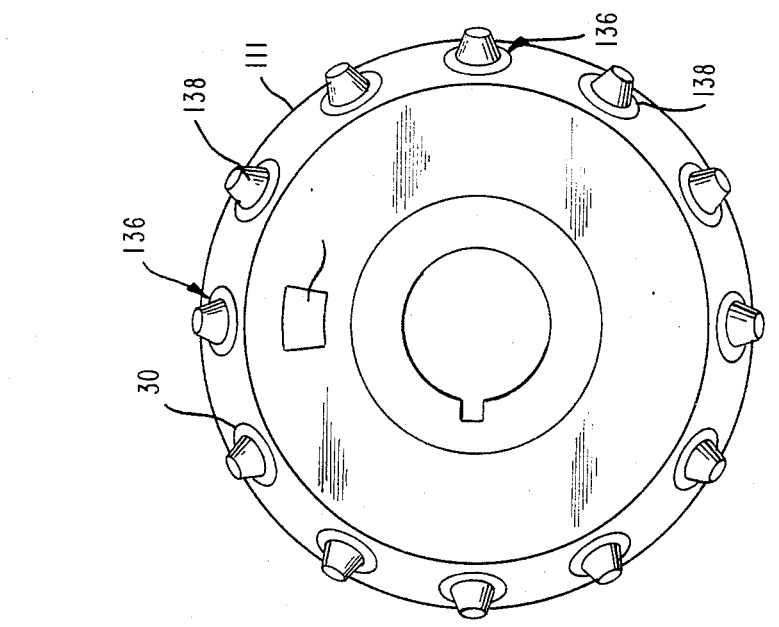
FIG. 10 is a side view of another segment of the worm wheel shown in FIG. 8.
Figure 8:
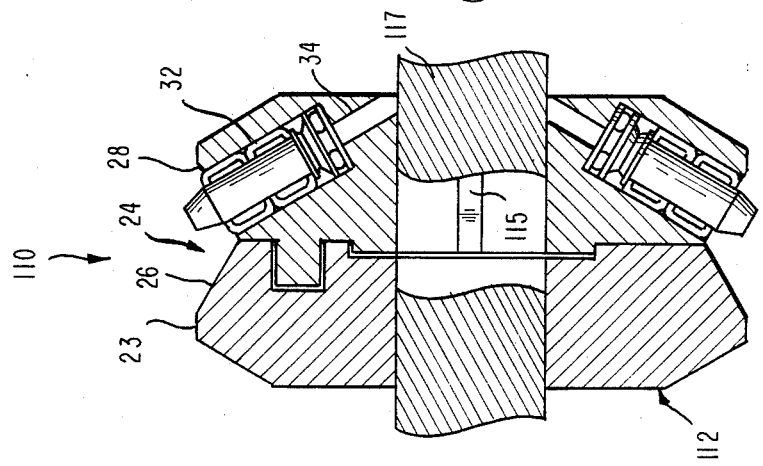
FIG. 8 is a cross-sectional view of an alternate embodiment of a worm wheel adapted for use in the worm drive system of FIGS. 1-7, the cross section being taken along a plane which is parallel to and includes an axis of rotation of the worm wheel.
Figure 9:
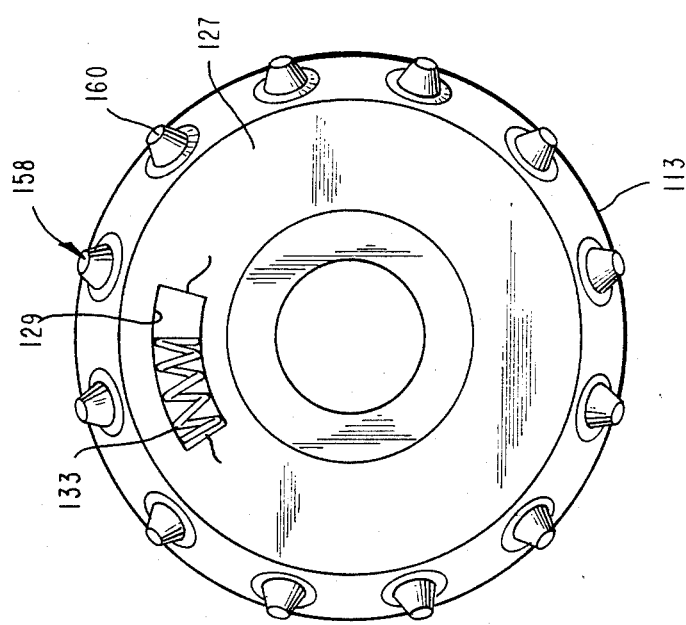
FIG. 9 is a side view of one segment of the worm wheel shown in FIG. 8.
Figure 11:
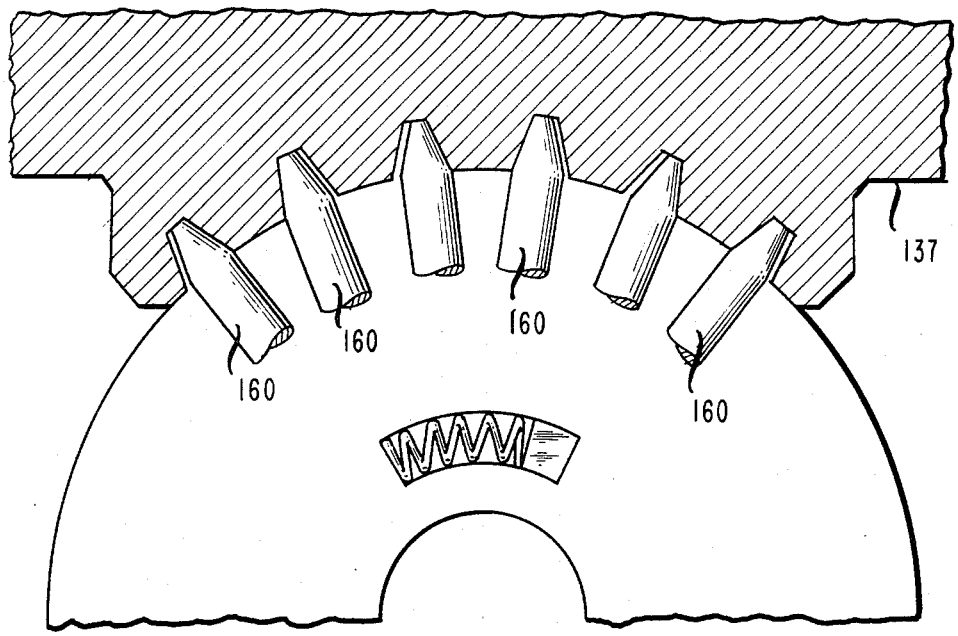
FIG. 11 is a diagrammatic illustration showing how the worm wheel of FIGS. 8-10 performs an anti-backlash function without a torque load on the worm wheel.
Figure 12:
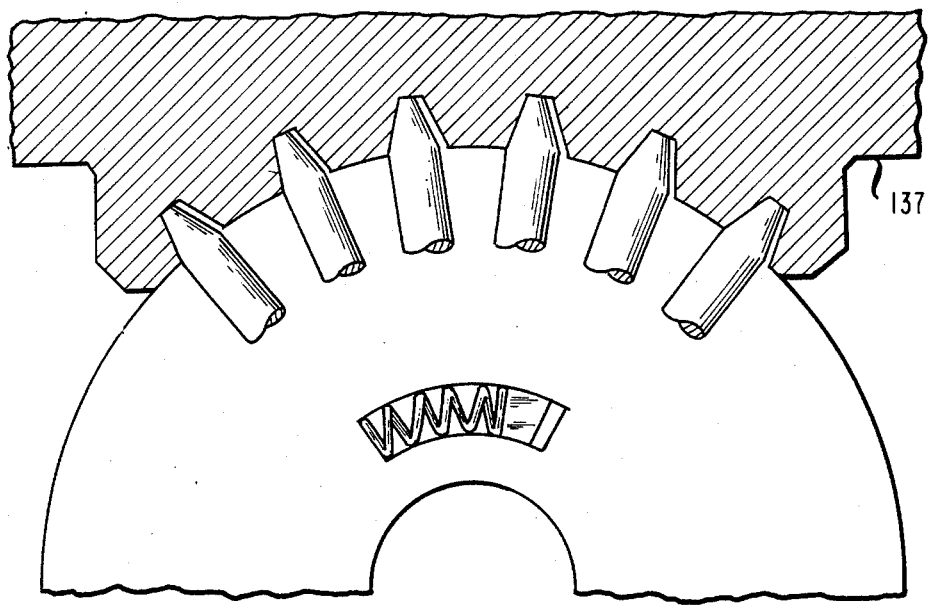
FIG. 12 is a diagrammatic illustration showing how the worm wheel of FIGS. 8-10 performs an anti-backlash function with the worm wheel under a torque load.

Another exemplary embodiment of the worm drive system of FIGS. 1–7 is illustrated in FIGS. 8–12. The various elements illustrated in FIGS. 8–12 which correspond to elements described above with respect to FIGS. 1–7 have been designated by corresponding reference numerals increased by one hundred. The embodiment of FIGS. 8–12 operates in the same manner as the embodiment of FIGS. 1–7, unless it is otherwise stated.

Referring now to FIGS. 8–12, a worm drive system 110 includes a worm wheel 112 having a first segment 111 and a second segment 113. The first segment 111 carries roller pin assemblies 136, each of which includes a roller pin 138. The second segment 113 carries roller pin assemblies 158, each of which includes a roller pin 160.

The first segment 111 is fixedly attached by a key 115 to a shaft 117 for conjoint rotation therewith. An inner face 123 of the first segment 111 is provided with a lug 125.

The second segment 113 is rotatably mounted on the shaft 117 and has an inner face 127 which is provided with an arcuate slot 129 sized and shaped so as to receive the lug 125 such that the lug 125 is adjacent to one end 131 of the slot 129. A coil spring 133 or a similar device is positioned in the slot 129 between an opposite end 135 of the slot 129 and the lug 125. The coil spring 133 constantly urges the lug 125 towards the end 131 of the slot 129, whereby the first segment 111 is urged to rotate in one angular direction about the shaft 117 and the second segment 113 is urged to rotate in an opposite angular direction about the shaft 117. Thus, the coil spring 133 urges the roller pins 138 carried by the first segment 111 against a trailing surface of their associated screw thread on a worm screw 137, while simultaneously urging the roller pins 160 carried by the second segment 113 against a leading surface of their associated screw thread on the worm screw 137, whereby the entire torque load will be carried by the roller pins 160 of the second segment 113 (see FIG. 11). Because the engaged roller pins 138 of the first segment 111 are urged against the trailing surface of their associated screw thread and the engaged roller pins 160 of the second segment 113 are urged against the leading surface of their associated screw thread, any rotary play between the worm wheel 112 and the worm screw 137 is eliminated, thereby ensuring that rotation of the worm wheel shaft 117 will result in the corresponding rotation of the worm screw 137 and vice versa.

As long as the total torque load is less than the pressure of the coil spring 133, the engaged rollers of the second segment 113 will continue to carry all of the torque load. Once the torque load exceeds the pressure of the coil spring 133, the coil spring 133 is compressed to permit the engaged roller pins 138 of the first segment 111 to contact the leading surface of their associated screw thread, whereby the total torque load will be shared equally between the engaged roller pins 138 of the first segment 111 and the engaged roller pins 160 of the second segment 113 (see FIG. 12). By designing the coil spring 133 such that its pressure is equal to half of the total design torque load, the engaged roller pins 160 of the second segment 113 would never have to carry more than half of the total torque load.

It will be understood that the embodiments described herein are merely exemplary and that a person skilled in the art may make many variations and modifications without departing from the spirit and scope of the invention. All such modifications and variations are intended to be included within the scope of the invention as defined in the appended claims.

I claim:
1. A worm drive system, comprising:
   (a) a worm wheel mounted for rotation about a worm wheel axis of rotation;
   (b) first and second sets of rollers, each of said rollers having a roller axis, and means for mounting each of said rollers on said worm wheel for rotation about its roller axis relative to said worm wheel, the roller axes of said rollers of said first and second sets being disposed in different orientations relative to said worm wheel axis of rotation so that said roller axes of said rollers of said first set extend toward one point on said worm wheel axis of rotation and said roller axes of said rollers of said second set extend toward another, different point on said worm wheel axis of rotation; and
   (c) a first worm screw having a first screw thread in mating engagement with said first set of rollers on said worm wheel and a second screw thread in mating engagement with said second set of rollers on said worm wheel, said second screw thread of said first worm screw being separate and distinct from said first screw thread of said first worm screw, said second screw thread having a configuration different than said screw thread, said first screw thread having surfaces matching the surfaces generated by said rollers of said first set upon simultaneous rotation of said worm wheel and said first worm screw, the second screw thread having surfaces matching the surfaces generated by said rollers of said second set upon simultaneous rotation of said worm wheel and said first worm screw.

2. A worm drive system according to claim 1 wherein said mounting means is operative to permit each of said rollers to move along its roller axis relative to said worm wheel between a fully extended position and a retracted position, said mounting means including urging means for urging each of said rollers towards its fully extended position by exerting on each roller a predetermined force in the direction along its roller axis corresponding to a predetermined percentage of the overall load on said worm wheel, so that any roller carrying a load which exceeds said predetermined percentage of the overall load on said worm wheel will automatically move away from its fully extended position towards its retracted position.

3. A worm drive system according to claim 2, wherein said urging means includes a plurality of disk springs, one for each of said rollers.

4. A worm drive system according to claim 1, wherein said worm wheel includes a first segment carrying said first set of rollers and a second segment carrying said second set of rollers, said segments being rotatable relative to one another about said worm wheel axis, the system further comprising rotation bias means for biasing said segments in opposite angular directions relative to one another about said worm wheel axis whereby said rollers of said first set of rollers are constantly urged towards a thread surface on one side of said first screw thread of said first worm screw and said rollers of said second set of rollers are constantly urged towards a thread surface on an opposite side of said second screw thread of said first worm screw to thereby eliminate backlash between said worm wheel and said first worm screw.

5. A worm drive system according to claim 4, wherein said rotation bias means includes a spring connected between said segments.

6. A worm drive system according to claim 1 wherein said worm wheel defines a medial plane normal to said worm wheel axis of rotation and the roller axes of said first and second sets of rollers are disposed at oppositely directed angles relative to said medial plane so that the roller axes of said first and second sets slope toward said worm wheel axis of rotation on opposite sides of said medial plane.

7. A worm drive system according to claim 6, wherein said rollers of said first set of rollers are staggered in relationship to said rollers of said second set of rollers.

8. A worm drive system according to claim 7, wherein said rollers of said first set of rollers lie on one side of said medial plane and said rollers of said second set of rollers lie on an opposite side of said medial plane.

9. A worm drive system as claimed in claim 6 wherein said mounting means includes anti-friction bearings associated with said rollers, the bearings associated with the rollers of said first set being disposed on one side of said medial plane, the bearings associated with the rollers of said second set being disposed on the opposite side of said medial plane.

10. A worm drive system as claimed in claim 6, wherein said worm wheel has no rollers mounted thereto in engagement with said worm screw other than said first and second sets of rollers.

11. A worm drive system according to claim 6, further comprising a second worm screw having a first screw thread in mating engagement with said first set of rollers on said worm wheel and a second screw thread in mating engagement with said second set of rollers on said worm wheel, said second screw thread of said second worm screw being separate and distinct from said first screw thread of said second worm screw.

12. A worm drive system according to claim 11, wherein said worm wheel and said first worm screw have a first predetermined ratio between them and said worm wheel and said second worm screw have a second predetermined ratio between them, said second predetermined ratio being different from said first predetermined ratio, whereby said work drive system may be used as a speed increaser and/or a speed decreaser.

13. A worm drive system as claimed in claim 12 wherein said worm wheel has no rollers mounted thereto in engagement with said worm screws other than said first and second sets of rollers.

14. A worm drive system according to claim 12 wherein said rollers of said first set of rollers are staggered in relationship to said rollers of said second set of rollers.

15. A worm drive system according to claim 14, wherein said rollers of said first set of rollers lie on one side of a plane which is normal to said axis of rotation of said worm wheel and said rollers of said second set of rollers lie on an opposite side of said plane.

16. A worm drive system according to claim 11, wherein said first and second screw threads of said first worm screw have the same hand and said first and second screw threads of said second worm screw have a hand opposite from that of said first and second threads of said first worm screw, said first worm screw and said second worm screw being disposed on opposite sides of said worm wheel axis of rotation, whereby said first and second worm screws rotate in the same angular direction upon rotation of said worm wheel.

17. A worm drive system as claimed in claim 16 wherein said worm wheel has no rollers mounted thereto in engagement with said worm screws other than said first and second sets of rollers.

18. A worm drive system according to claim 16, wherein said rollers of said first set of rollers are staggered in relationship to said rollers of said second set of rollers.

19. A worm drive system according to claim 18, wherein said rollers of said first set of rollers lie on one side of a plane which is normal to said axis of rotation of said worm wheel and said rollers of said second set of rollers lie on an opposite side of said plane.

20. A worm drive system according to claim 11 wherein said first screw thread of said second worm screw has screw thread surfaces matching the surfaces generated by said rollers of said first set upon simultaneous rotation of said worm wheel and said second screw thread of said second worm screw having screw thread surfaces matching the surfaces generated by said rollers of said second set upon simultaneous rotation of said worm wheel and said second worm screw.

* * * * *

UNITED STATES PATENT AND TRADEMARK OFFICE
CERTIFICATE OF CORRECTION

PATENT NO. : 4,685,346

DATED : August 11, 1987

INVENTOR(S) : George E. Brackett

It is certified that error appears in the above-identified patent and that said Letters Patent is hereby corrected as shown below:

Column 1, line 31, "diagnosed" should read -- disclosed --.
Column 2, line 37, "separately" should read -- separate --.
Column 4, line 60, "a" should read -- A --.
Column 6, line 22, "$T_1$" should read -- $T^1$ --.
Column 7, line 3, "brom" should read -- from --.
Column 8, line 59, after "than said" insert -- first --.
Column 10, line 15, "work" should read -- worm --.

Signed and Sealed this

Twenty-second Day of March, 1988

*Attest:*

DONALD J. QUIGG

*Attesting Officer*      *Commissioner of Patents and Trademarks*